H. W. PERKINS.
FILTER.
APPLICATION FILED JULY 8, 1915.
1,172,728.
Patented Feb. 22, 1916.
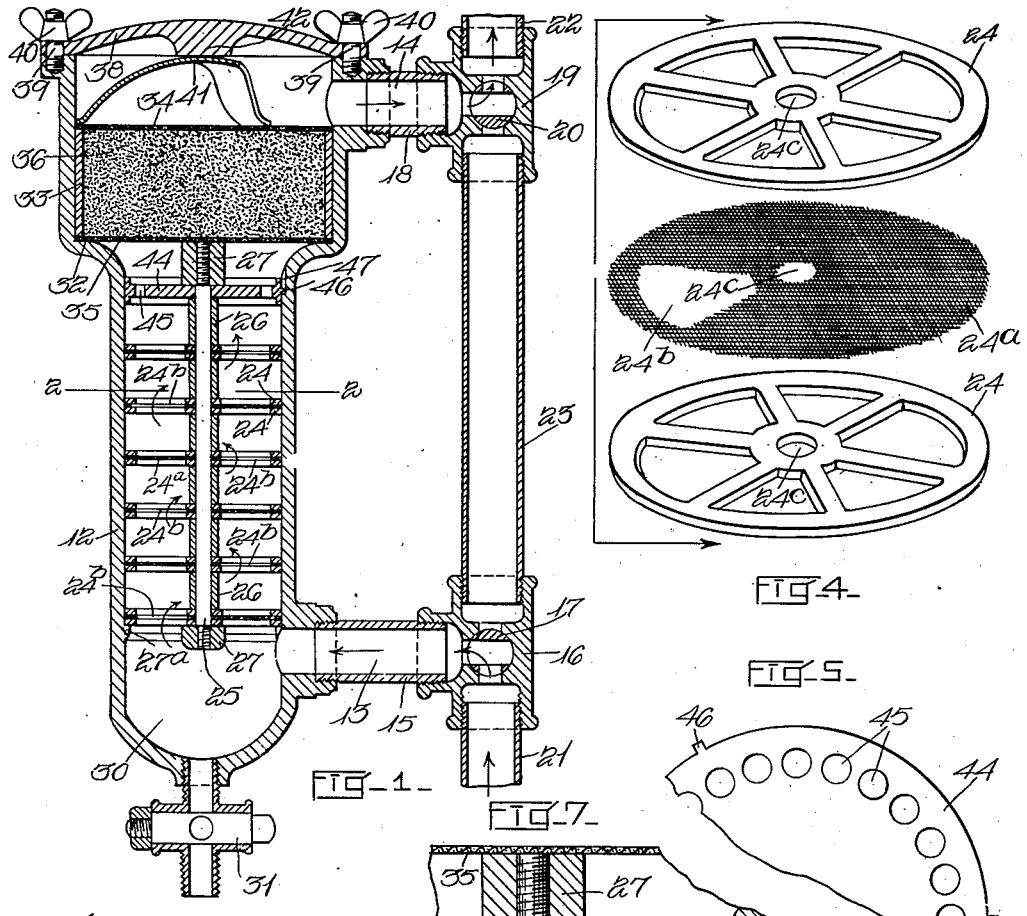
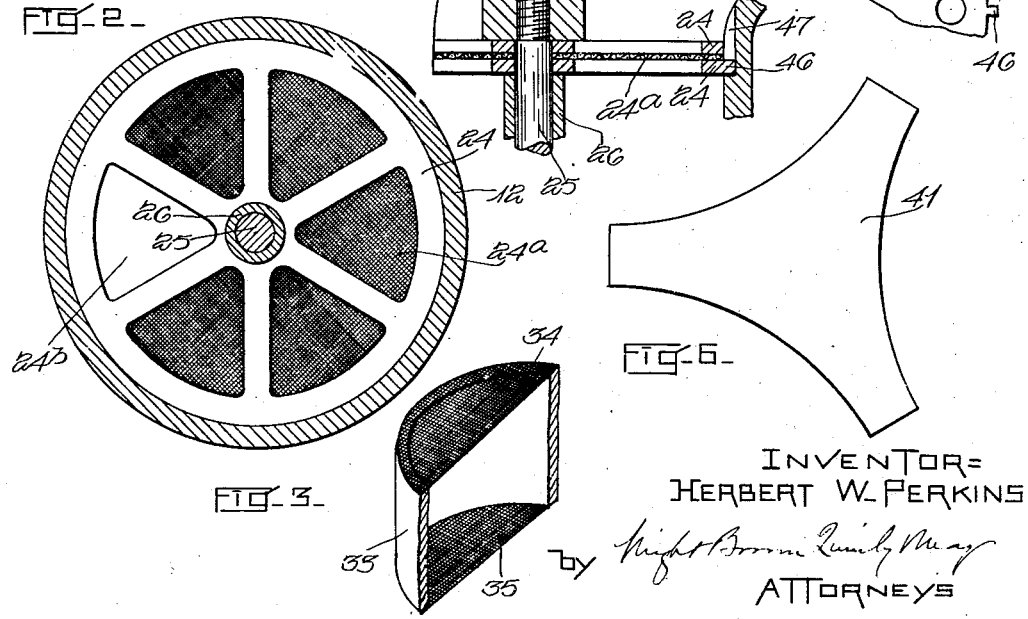
INVENTOR:
HERBERT W. PERKINS
by
ATTORNEYS

UNITED STATES PATENT OFFICE.

HERBERT W. PERKINS, OF LYNN, MASSACHUSETTS.

FILTER.

1,172,728.     Specification of Letters Patent.     Patented Feb. 22, 1916.

Application filed July 8, 1915. Serial No. 38,753.

*To all whom it may concern:*

Be it known that I, HERBERT W. PERKINS, a subject of the Dominion of Canada, and resident of Lynn, in the county of Essex and State of Massachusetts, have invented certain new and useful Improvements in Filters, of which the following is a specification.

This invention has for its object to provide a filter having effective sediment arresting means, and adapted to be quickly and conveniently cleansed by a reversal of the flow of water through it, the construction being such as to permit the convenient separation and assemblage of the parts.

The invention consists in the improvements which I will now proceed to describe and claim.

Of the accompanying drawings forming a part of this specification: Figure 1 represents a vertical section of a filter embodying my invention; Fig. 2 represents a section on line 2—2 of Fig. 1; Fig. 3 represents a fragmentary perspective view of a portion of the filtering body shown by Fig. 1; Fig. 4 shows in perspective the parts of one of the hereinafter described sediment-collecting deflectors separated from each other; Fig. 5 represents a plan view of a portion of the distributing plate hereinafter described; Fig. 6 represents a top view of the confining spring shown in section by Fig. 1; Fig. 7 represents a fragmentary sectional view, the distributing plate being omitted.

The same reference characters indicate the same or similar parts in all the views.

In the drawings, 12 represents a vertical tubular conduit having a lateral inlet 13 at its lower portion and a lateral outlet 14 at its upper portion. The inlet is connected by a pipe 15 with a lower three-way valve composed of a casing 16 and a plug 17 adapted to turn therein. The outlet is connected by a pipe 18 with an upper three-way valve composed of a casing 19 and plug 20. The casing 16 is connected with a supply pipe 21, and the casing 19 is connected with a delivery or service pipe 22. The two casings are connected by a by-pass 23. In the conduit 12 are placed a series of horizontal sediment-collecting deflectors, each of which is preferably composed of two spiders 24 having circular margins and radial arms bounding a series of openings through the spiders, and an intermediate disk 24$^a$ of foraminous material such as fine wire cloth interposed between said spiders and having a portion cut away to form an opening 24$^b$ of the same form as the spider openings.

The spiders 24 and disk 24$^a$ are so assembled that the spider arms coincide with each other, and the opening 24$^b$ coincides with one of the openings through the two spiders, the wire fabric extending across the other spider openings. Each deflector therefore presents an open or unobstructed passage formed by the opening 24$^b$ and the spider portions surrounding it, and a series of straining openings or passages partially obstructed by the fabric of the disk 24$^a$.

The spiders and the intermediate disk are provided with central orifices 24$^c$, receiving a bolt 25 which connects the deflectors in a vertical series, the deflectors being spaced apart on the bolt by spacing collars 26, and the bolt being provided with confining nuts 27 at its ends. The conduit is provided internally with means such as a shoulder 27$^a$, forming a seat for the lower deflector 24, whereby the connected deflectors are removably supported in the conduit between the inlet and outlet thereof, as shown by Fig. 1. The passages 24$^a$ of the deflectors are in staggered relation to each other, as shown by Fig. 1, so that water flows unobstructedly in a sinuous course through the conduit, as indicated by the curved arrows.

On the upper end of the rod 25 is mounted a circular distributing plate 44 confined between the upper spacing collar 26 and the upper nut 27, and closely fitting the conduit 12. Said plate is provided with a circular series of orifices 45 which distribute the water uniformly to the filtering member hereinafter described. The distributing plate is provided with lugs 46 entering slots 47 in the upper portion of the conduit 12, said slots and lugs preventing rotary movement of the distributing plate and deflectors in the conduit. Said lugs and the lower ends of the slots 47 may support the distributing plate and deflectors in the conduit, in which case the shoulder 27$^a$ may be omitted. In other words, the conduit is provided with internal supporting means, which may be embodied in the slots 47 or in the shoulder 27$^a$, either of said means being adapted to support the series of deflectors and the distributing plate. The distributing plate may be omitted however, and the upper deflector may be provided with lugs 46 adapted to enter the slots 47 and bear on the lower ends thereof, as indicated by Fig. 7.

The conduit has a sediment pocket 30 at its lower end below the inlet 13, and a cock or valve 31 for the discharge of water and sediment from said pocket. The conduit is enlarged above the series of deflectors and the distributing plate to form an annular seat or shoulder 32 which supports a filtering body between the distributing plate and the outlet. Said body is composed of a curb 33 fitting the interior of the enlarged portion of the conduit, foraminous top and bottom members 34, 35, attached to said curb, and a filling 36 of filtering material, such as crushed quartz or charcoal confined by said curb and foraminous members. The enlarged upper portion of the conduit has a top opening through which the filtering body and deflectors may be inserted and removed, said opening being closed by a water-tight cover 38 secured by bolts 39 and nuts 40.

41 represents a confining spring formed as shown by Figs. 1 and 6, said spring bearing on a boss 42 on the cover 38, and on the margin of the filtering body to hold the latter against the seat 32. When the three-way valves are adjusted as shown by Fig. 1, water flows from the supply pipe upwardly through the conduit 12, and outwardly to the delivery pipe 22. The coarser sediment carried by the water is arrested by the foraminous portions of the deflectors and accumulates in the meshes and on the sides thereof. The finer sediment and impurities are arrested by the filtering material 36. When the three-way valves are adjusted to shut off the entering water from the inlet 13, and to shut off the delivery pipe 22 from the outlet, the entering water flows through the by-pass 23 to the outlet 14 and downwardly through the conduit, the cock 31 being at the same time opened, so that the entering water flushes and cleans the filtering body and the deflectors, and carries the sediment through the cock 31.

When the conduit is to be opened, the plugs of the three-way valves are adjusted to shut off both the supply pipe 21 and the delivery pipe 22. The cover 38 may now be opened, and the filtering body and the connected distributing plate and deflectors may be removed through the top opening. Provision is therefore made for reversing the flow of water through the conduit and for conveniently removing and installing the filtering body, the distributing plate, and the deflectors.

It will be seen that water flowing backwardly through the conduit passes downwardly through the foraminous portions of the deflectors and dislodges the sediment collected thereby, so that the deflectors may be quickly and thoroughly cleansed. It will also be seen that when the filter is in operation the fine meshes of the foraminous disks 24ª act to anchor the arrested sediment contacting with said disks. The sediment gradually fills said meshes and accumulates on the sides of said disks, forming coatings which are gradually thickened by accretions of sediment adhering to the particles first arrested, said coatings being confined edgewise by the margins of the spider openings.

Having described my invention, I claim:

1. A filter comprising a vertical cylindrical conduit composed of a lower portion of relatively small diameter and provided with internal supporting means, an enlarged upper portion having a top opening, the lower portion being provided with an inlet and the upper portion with an outlet, a plurality of spaced-apart horizontal sediment-collecting deflectors connected in a vertical series removably inserted in the lower portion of the conduit, and removably supported by said internal supporting means, said deflectors being formed to coöperate with said lower portion in forming a sinuous passage therethrough, a filtering body removably supported in the larger conduit portion, and a removable cover closing said top opening, the filtering body and the series of deflectors being removable through the top opening when the cover is removed.

2. A filter comprising a vertical conduit having an inlet at its lower portion, an outlet at its upper portion, a relatively large top opening adjacent to said outlet, and a removable cover for said opening, a plurality of sediment-collecting deflectors, each formed to fit a portion of the interior of the conduit, and each having a central orifice and an unobstructed water-conducting passage at one side of said orifice, and a rod coupling said deflectors together in a series with their water passages staggered, the deflectors being spaced apart on the rod, the conduit being provided internally with means for detachably supporting the series of deflectors between the inlet and outlet, and the series of deflectors being removable from the conduit through said top opening.

3. A filter comprising a vertical conduit having an inlet at its lower portion, an outlet at its upper portion, a relatively large top opening adjacent to the outlet, a removable cover for said outlet, and a seat below said top opening and outlet, a vertical series of sediment-collecting deflectors removably engaged with the conduit between said inlet and seat, a filtering body interposed between the deflectors and the outlet, and composed of a curb bearing on said seat, foraminous top and bottom members attached to said curb, and filtering material confined between said members.

4. A filter comprising a vertical conduit having an inlet at its lower portion, an outlet at its upper portion, a relatively large top opening adjacent to the outlet, a removable cover for said outlet and a seat below said top opening and outlet, a vertical series of sediment-collecting deflectors removably engaged with the conduit between said inlet and seat, a filtering body interposed between the deflectors and the outlet, and bearing removably on said seat, and a holding-down spring interposed between the cover and the filtering body confining the latter against the seat.

5. A filter comprising a vertical conduit having an inlet at its lower portion, an outlet at its upper portion, and a vertical series of horizontal apertured deflectors removably engaged with the conduit between the inlet and outlet, and coöperating with the conduit in forming a sinuous passage therethrough, said deflectors having unobstructed openings and openings partially obstructed by foraminous material.

6. A filter comprising a vertical conduit having an inlet at its lower portion and an outlet at its upper portion, and a vertical series of horizontal apertured deflectors removably engaged with the conduit between the inlet and outlet and coöperating with the conduit in forming a sinuous passage therethrough, each deflector being composed of spiders and foraminous material interposed between the spiders and provided with an unobstructed opening.

7. A filter comprising a vertical conduit having an inlet at its lower portion, an outlet at its upper portion, a vertical series of sediment-collecting deflectors above the inlet and below the outlet, a filtering body between said deflectors and the outlet, and a distributing plate between the deflectors and the filtering body.

In testimony whereof I have affixed my signature.

HERBERT W. PERKINS.